US00RE39572E

(19) United States
(12) Reissued Patent
Lawson

(10) Patent Number: US RE39,572 E
(45) Date of Reissued Patent: Apr. 17, 2007

(54) OUTBOARD JET DRIVE BOAT

(75) Inventor: William Lawson, Ormond Beach, FL (US)

(73) Assignee: Sword Marine Technology, Inc., Ormond Beach, FL (US)

(21) Appl. No.: 10/860,665

(22) Filed: Jun. 3, 2004

Related U.S. Patent Documents

Reissue of:
(64) Patent No.: 6,398,600
Issued: Jun. 4, 2002
Appl. No.: 09/635,301
Filed: Aug. 9, 2000

U.S. Applications:
(60) Provisional application No. 60/149,362, filed on Aug. 18, 1999.

(51) Int. Cl.
*B63H 11/00* (2006.01)

(52) U.S. Cl. ..... 440/38
(58) Field of Classification Search ..... 440/38, 440/40, 42, 46, 47, 53, 55, 56, 57, 111, 112, 440/900
See application file for complete search history.

(56) References Cited

U.S. PATENT DOCUMENTS 3,336,752 A 8/1967 Smith
3,389,558 A * 6/1968 Hall ..... 440/38
3,809,005 A 5/1974 Rodler, Jr.
4,073,257 A 2/1978 Rodler, Jr.
4,281,996 A 8/1981 Mouraret
4,437,841 A * 3/1984 Stallman
4,457,724 A 7/1984 Miyamoto
4,722,708 A 2/1988 Baltz
4,792,282 A 12/1988 Jordan
4,820,215 A * 4/1989 Mizusawa et al.
4,897,059 A 1/1990 Newman
5,211,592 A * 5/1993 Alkema
5,346,363 A 9/1994 Stallman et al.
5,356,319 A 10/1994 Parker (Continued)

OTHER PUBLICATIONS

International Search Report, International application No. PCT/US00/40604, mailed Jul. 2, 2001.*

*Primary Examiner*—Lars A. Olson
(74) *Attorney, Agent, or Firm*—Howard M. Gitten; Edward Angell Palmer & Dodge, LLP

(57) ABSTRACT

An outboard jet drive boat apparatus has a boat hull (11) having a transom (12) and having a removably attached outboard jet drive (10) attached to the transom (12). The outboard jet drive (10) includes a housing (13) sealed against the intrusion of water and has an engine mounting platform (14) therein having an engine (16) mounted thereon on flexible engine mounts (15). The housing (13) has a sealable entrance through the top thereof and is removably attached to the transom of the hull (11). A jet drive unit (17) is attached in the housing (13) below the engine supporting platform (14) and extending generally parallel to the engine (16) and extending from the front of the housing (13) out the rear of the housing. The jet drive unit (17) is operatively attached to the overhead engine (16) through a clutch mechanism. A main fuel tank (33) is positioned inside the hull (11) and is connected to a fuel line (35) to an auxiliary fuel tank (38) inside the housing (13) and the auxiliary fuel tank (38) is connected to the engine (16) for feeding fuel to the engine (16). The fuel pump (41) is mounted in the housing (13) to pump fuel to the engine (16) from the auxiliary fuel tank (38) and from the main fuel tank (33) to the auxiliary fuel tank (38). Electrical controls are located in the hull couple through the housing (13) to the engine controls and controls the engine (16) and jet drive unit (17).

30 Claims, 3 Drawing Sheets

U.S. PATENT DOCUMENTS

| | | | | |
|---|---|---|---|---|
| 5,383,801 | A | | 1/1995 | Chas |
| 5,435,763 | A | * | 7/1995 | Pignata |
| 5,460,552 | A | * | 10/1995 | Blanchard et al. |
| 5,536,187 | A | * | 7/1996 | Nanami |
| 5,685,802 | A | * | 11/1997 | Kanno |
| 5,752,863 | A | | 5/1998 | Baker |
| 5,769,674 | A | | 6/1998 | Stallman |
| 5,913,294 | A | * | 6/1999 | Takahashi et al. |
| 5,938,490 | A | | 8/1999 | Rodler |
| 6,004,173 | A | | 12/1999 | Schott |
| 6,059,618 | A | * | 5/2000 | Purnell et al. |
| 6,132,269 | A | * | 10/2000 | Belt |
| 6,149,478 | A | * | 11/2000 | Lehmann |
| 6,193,569 | B1 | | 2/2001 | Davies et al. |
| 6,293,842 | B1 | | 9/2001 | Belt |
| 6,361,387 | B1 | | 3/2002 | Clarkson |
| 6,398,600 | B1 | | 6/2002 | Lawson |
| 6,482,055 | B1 | | 11/2002 | Freitag |

* cited by examiner

OUTBOARD JET DRIVE BOAT

Matter enclosed in heavy brackets [ ] appears in the original patent but forms no part of this reissue specification; matter printed in italics indicates the additions made by reissue.

This application claims the benefit of U.S. Provisional Application, No. 60/149,362, filed Aug. 18, 1999.

BACKGROUND OF THE INVENTION

The present invention relates to an outboard jet drive boat and especially to an outboard jet drive having an engine and jet drive mounted in a housing which is removably attached to the transom of a boat hull.

There have been several proposed types of outboard set drives for watercraft but most are similar to an outboard motor in which the outboard motor propeller and lower unit have been replaced with a jet drive. The jet drive includes a jet pump in the lower unit that operates so as to provide propulsion force for a watercraft. There are advantages in employing jet pumps for propulsion units as opposed to propellers. The jet drive permits operation in shallower water and also the propeller is shrouded and there is less likelihood of injury. There has been a variety of proposed constructions for outboard jet drives for positioning the jet pump in different positions relative to the hull transom and bottom of the transom but in a typical jet drive, the engine and jet drive are located directly in the hull with an opening in the bottom of the hull for capturing water passing under the hull and then utilizing the jet pumps to thrust the water out the rear of the hull to propel the boat. Outboard jet drive units are made similar to typical outboard motors with a motor driving a drive unit which operates a jet drive unit.

Prior art outboard liquid jet propulsion units can be seen in the Nanami U.S. Pat., No. 5,536,187, for an outboard jet drive for watercraft in which the jet propulsion unit is disposed forwardly of the transom and beneath the undersurface of the hull for improving its pumping efficiency while the motor is attached to the transom of the boat. In the Jordan U.S. Pat., No. 4,459,117, a liquid jet propulsion unit is driven by a conventional outboard motor. The drive of the motor directly rotates an impeller which draws water into the impeller chamber and through an outlet chamber and nozzle to drive the craft forward. In the Miyamoto U.S. Pat., No. 4,457,724, an apparatus for driving a surfboard includes an internal combustion engine mounted in a box which is mounted on the rear portion of the surfboard. A water jet propelling device is driven by the internal combustion engine for propelling the surfboard. The exhaust gas system in the water jet propelling device is positioned in the box. In the U.S. Pat. to Boyer et al., No. 4,942,838, an inflatable watercraft has a portable engine package. The engine package includes an internal combustion engine mounted in a thin fiberglass hull. The base plate of the hull includes a water inlet scoop for feeding water to the pump and an exhaust port for exhausting the water. The pumps high pressure water outlet is pointed in the aft direction above the water line to propel the craft by the reaction force resulting from the high velocity water jet. In the F.C. Clark U.S. Pat., No. 3,055,175, a marine propulsion unit takes a conventional outboard motor and replaces the prop unit with a marine jet motor using a pump to issue a jet of water to propel a boat. The Parker U.S. Pat., No. 5,356,319, is for a boat with a removably inboard jet propulsion unit in which the integral jet power unit is encased in a waterproof housing and positioned in a well located in the hull and is mounted to be removed from the hull.

The present invention is directed towards an outboard jet boat in which the main fuel tank and controls are mounted within the hull of a boat while the outboard jet drive unit is mounted in a housing with an engine and is removably attached to the transom of the boat. The fuel tank and controls are connected between the hull and outboard drive through quick disconnect couplings. The housing is shaped to support an engine on a platform directly over the jet drive unit for actuating the jet drive unit through a clutch mechanism with the engine and jet drive positioned parallel to each other.

SUMMARY OF THE INVENTION

An outboard jet drive boat apparatus has a boat hull having a transom and having a removably attached outboard jet drive attached to the transom. The outboard jet drive includes a housing sealed against the intrusion of water and has an engine mounting platform therein having an engine mounted thereon on flexible engine mounts. The housing has a sealable entrance through the top thereof and is removably attached to the transom of the hull. A jet drive unit is attached in the housing below the engine supporting platform and extends generally parallel to the engine from the front of the housing and through the rear of the housing. The jet drive unit is operatively attached to the overhead engine through a clutch mechanism. A main fuel tank is positioned inside the hull and is connected with a fuel line to an auxiliary fuel tank inside the housing and the auxiliary fuel tank is connected to the engine for feeding fuel to the engine. The fuel pump is mounted in the housing to pump fuel to the engine from the auxiliary fuel tank and from the main fuel tank to the auxiliary fuel tank. Electrical controls are located in the hull and coupled through the housing to the engine to control the engine and jet drive unit. Quick disconnect couplings allow the fuel line and control lines to be rapidly connected and disconnected to the outboard drive unit.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
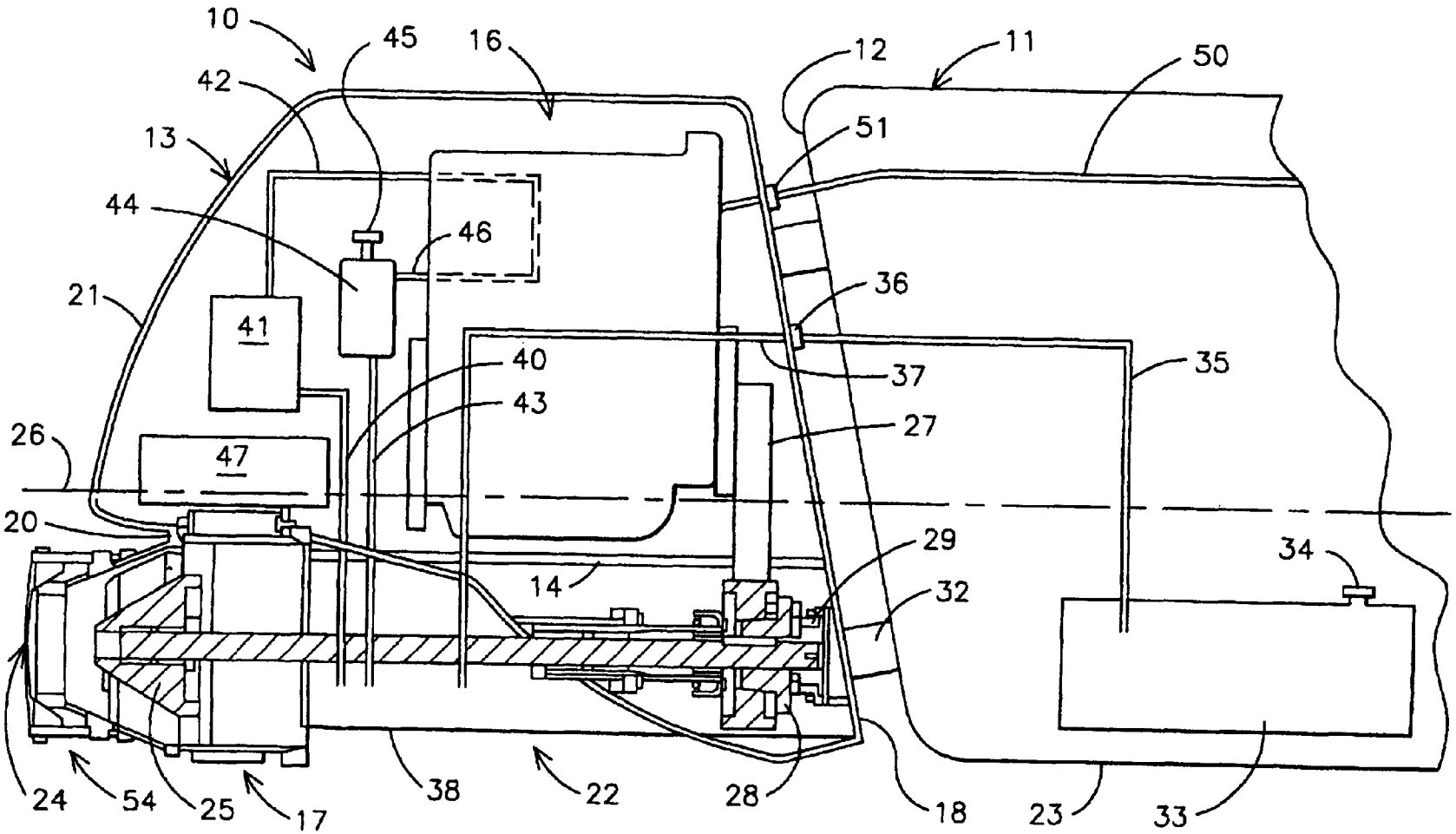
FIG. 1 is a sectional view taken through an outboard jet drive boat in accordance with the present invention.
Figure 2:
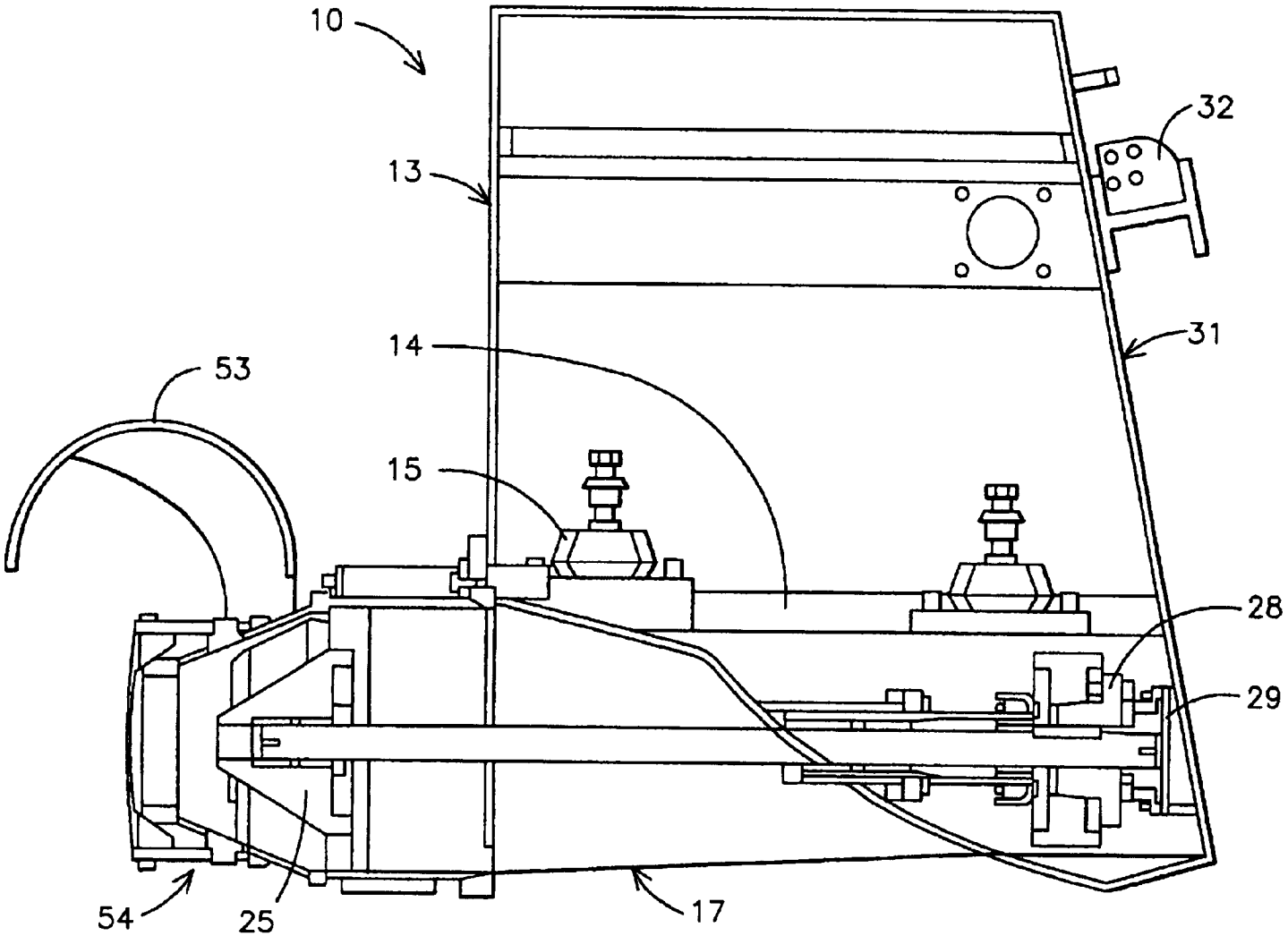
FIG. 2 is a sectional view of an outboard jet drive housing having a jet drive unit mounted therein.
Figure 3:
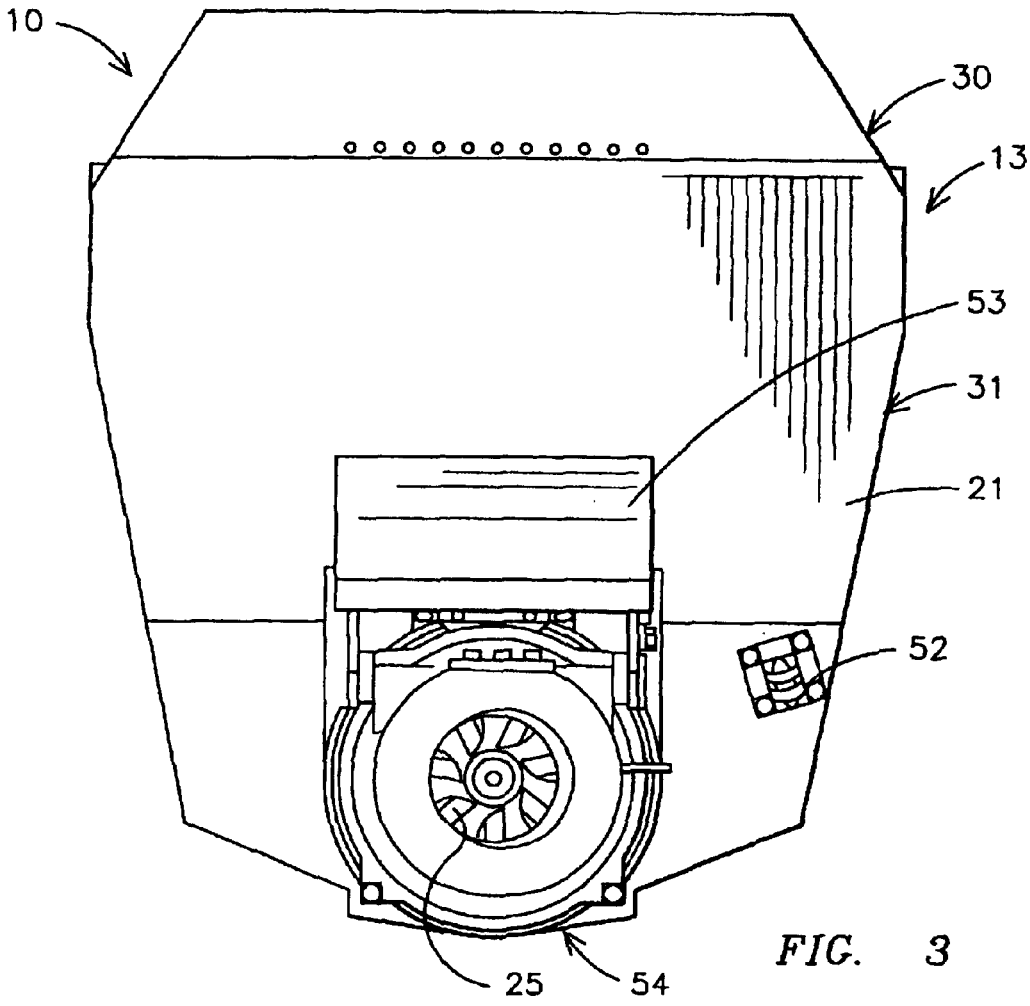
FIG. 3 is a rear elevation of the jet drive unit of FIG. 2.

Referring to FIGS. 1–3, an outboard jet drive unit 10 is shown attached to the hull of a boat 11 on the transom 12. The outdrive unit includes a housing 13 having a platform 14 mounted therein and having a plurality of flexible engine mounts 15 attached to the platform 14. An internal combustion engine 16 is mounted to the engine mounts 15 on the platform 14. The engine is preferably a diesel engine having a turbocharger with an intercooler. A jet drive unit 17 is mounted beneath the platform 14 of the housing 13 and is attached to the front end 18 of the housing 13. The jet drive unit extends through the rear 21 of the housing, out an opening 20 in the housing 13. The jet drive unit 17 has a water intake 22 and is positioned to be about level with the bottom 23 of the hull 11. A water exhaust 24 extending out the rear of the housing 13. A jet pump 25 is mounted in the jet drive 17 for drawing the water thereinto through the jet pump and out the water exhaust 24. The jet drive unit 17 is shown below the water line 26 and is supported on brackets 29 on the front 18 of the housing 13. Engine 16 has a belt drive 27 having a clutch mechanism therein for connecting the engine 16 to the drive pulley 28 of the jet drive unit 17. The housing 13 is sealed against the intrusion of water thereto and sealed between the platform 14 and the housing 13 to prevent water intrusion and to prevent oil or engine antifreeze from escaping therefrom.

The housing 13 top 30 is removable from the housing main part 31, as shown in FIG. 3. The housing 13 with the engine 16 and the jet drive unit 17 mounted therein is attached to the transom 12 of the hull 11 with a pair of brackets 32. Brackets 32 allow the housing 13 to be mounted even with the bottom of the boat hull or higher than the bottom of the boat hull so as to reduce ingression of debris and damage to wildlife. The hull 11 has the main fuel tank 33 mounted therein having a fuel tank inlet 34 and a fuel line 35 extending therefrom through the transom 12 and to a quick disconnect 36 where it can be quickly coupled or decoupled from an internal fuel line 37 located inside the housing 13. The fuel line 37 enters an auxiliary internal fuel tank 38 which has a fuel line 40 connected thereto which is connected to a fuel pump 41 for pumping the fuel from the auxiliary fuel tank 38 and from the main fuel tank 33 and into the fuel line 42 where it is fed directly into the fuel injectors of the engine 16. A fuel return line 43 is connected to the auxiliary fuel tank 38 and to a de-aerator 44 having a bleed top 45 and having a return fuel line 46 from the engine 16 fuel injectors. A battery 47 is shown mounted within the housing 13 and is connected through a ground line 48 to the jet drive unit 17. The engine and drive unit are controlled through electrical control lines 50 which is connected through a quick electrical connector 51 which is a waterproof connector mounted through the housing 13 and to the engine 16 and clutch unit 27 to control the operation of the outboard jet drive unit.

The rear wall 21 of the housing 13 has a tow bracket 52 attached thereto for attaching a line. The jet drive unit 17 may also have an anti-cavitation plate 53 attached to the exhaust portion 54 of the jet drive unit.

Figure 4:
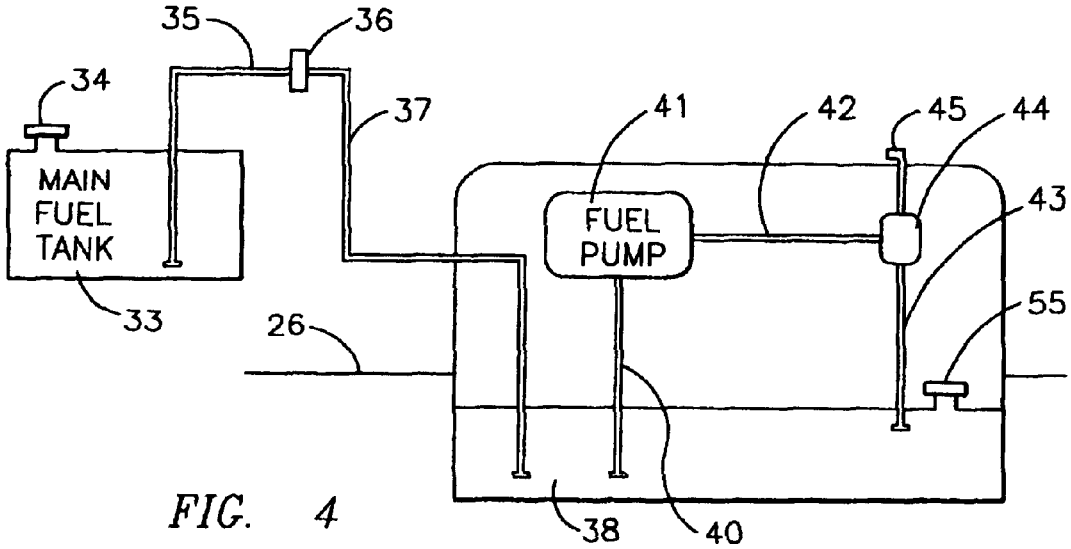
FIG. 4 is a block diagram of the connected fuel tanks.

As seen in FIG. 4, the main fuel tank 33 having the filler cap 34 is connected through the fuel line 35 to the auxiliary tank 38 having an auxiliary tank opening 55 and having the fuel pump 41 connected through the fuel line 40 from the auxiliary tank 38 and through a line 42 to the fuel injectors and back through a de-aerator 44 from the fuel injectors and through the fuel line 43 back to the auxiliary fuel tank 38. A breather 45 is connected to the de-aerator unit 44.

In operation, the hull 11 has the fuel tank 33 installed therein along with all the controls and sensors. The controls and sensors are connected through the multi-line electrical conductor 50 while the fuel tank In is connected through the fuel line 35 through the transom 12. The outboard drive unit 10 can then be attached to the brackets 32 on the transom 12 in a position to align the bottom of the unit with the bottom of the hull 23. Then, merely attaching the quick connect couplings 36 to the fuel line, connects the fuel lines to the outboard jet drive while connecting the quick coupling 51 connects the electrical controls. If the unit has to be removed for any reason, it can be disconnected from the brackets 32 by disconnecting the quick couplings 36 and 51 to remove the entire unit. The outboard jet drive unit 10 is made by constructing a waterproof housing 13 mounting the jet drive unit 17 therein underneath the platform 14 and mounting the engine 16 to the engine mounts 15 on the platform 14 and then connecting the belt drive clutch mechanism 27 between the engine 16 and the jet drive unit 17 through the pulley 28.

It should be clear at this time that an improved removable outboard jet drive boat has been provided which forms a permanent part of the boat while allowing the quick disconnection and removal of the entire unit. This provides the advantages of a conventional inboard jet drive unit with an onboard fuel tank and control. However, the present invention should not be considered limited to the forms shown which are to be considered illustrative rather than restrictive.

I claim:

1. An outboard jet drive boat comprising:

a huly (11) having a transom (12);

a housing (13) sealed against the intrusion of water, said housing (13) having front and rear sides, and a top and bottom and having a sealable entrance through the top thereof, and said housing (13) being removably attached to the transom (12) of said hull (11);

an engine mounting platform (14) attached in said housing (13) and having a plurality of engine mounts (15) attached thereto;

an engine (16) mounted in said housing (13) and supported generally horizontally on said platform (14);

a jet drive unit (17) attached in said housing (13) below said platform (14) and extending generally parallel to said engine (16), said jet drive unit (17) extending from the rear of said housing (13) and being operatively attached to said engine (16) in said housing (13) above said platform (14); and a main fuel tank (33) positioned inside said hull (11) and having a fuel line (35) connecting said main fuel tank (33) to said engine (16) for the feeding of fuel from said fuel tank (33) to said engine (16), whereby an outboard jet drive (17) and engine (16) are removably attached to a boat hull (11) transom (12) and isolated in a separate housing (13).

2. An outboard jet drive boat in accordance with claim 1 in which a secondary fuel tank (38) is mounted in said housing (13) and coupled between said main fuel tank (33) and said engine (16).

3. An outboard jet drive boat in accordance with claim 2 in which said housing (13) has a transom (12) hanging bracket (32) attached thereto and positioned for attaching said housing (13) to said transom (12) of said boat hull (11).

4. An outboard jet drive boat in accordance with claim 3 in which said engine (16) is a diesel engine.

5. An outboard jet drive boat in accordance with claim 3 including a fuel pump (41) mounted in said housing (13) and coupled to said secondary fuel tank (38).

6. An outboard jet drive boat in accordance with claim 5 having engine controls mounted in said boat hull (11) coupled to said engine (16) and *said* jet drive unit (17) for controlling said engine from said hull (11).

7. An outboard jet drive boat in accordance with claim 6 in which [a] *said* jet drive unit (17) is mounted through said housing (13) rear side and attached to said front and rear sides.

8. An outboard jet drive boat in accordance with claim 7 having a battery mounted in said boat hull (11) and electrically connected to said engine (16) for starting said engine (16).

9. An outboard jet drive boat in accordance with claim 8 in which said engine (16) has monitoring sensors and said boat hull (11) has a plurality of engine instruments mounted therein operatively coupled to said engine sensors to provide sensed engine conditions in said engine instruments in said boat hull (11).

10. An out board jet drive boat in accordance with claim 8 having a clutched belt drive (27) operatively connecting said engine to said jet drive unit (17).

11. An out board jet drive boat in accordance with claim 10 in which said housing (13) is sealed against the intrusion of water and partially extends into the water when said boat hull (11) is afloat to provide added buoyancy to said boat hull (11).

12. An outboard jet drive boat in accordance with claim 11 in which said engine (16) has a sealed engine coolant system whereby the engine cooling is not dependent upon water from the body of water the boat hull (11) is floating upon.

13. An outboard jet drive boat in accordance with claim 8 in which said housing (13) has an auxiliary battery mounted therein.

14. An outboard jet drive boat in accordance with claim 5 in which said engine (16) is mounted to said mounting platform (14) generally parallel to said jet drive unit (17).

15. An outboard jet drive boat in accordance with claim 14 in which said engine (16) is mounted in a reverse direction to said jet drive unit (17).

16. An outboard jet drive boat in accordance with claim 1 in which said housing (13) is mounted to said transom (12) above the hull (11) bottom to thereby reduce the ingress of debris.

17. An outboard jet drive boat in accordance with claim 1 in which said platform (14) is sealed to said housing (13) to prevent the escape of leaking liquids from said engine.

*18. An outboard jet drive comprising:*

*a housing sealed against the intrusion of water, said housing having front and rear sides, and a top and bottom and having a sealable entrance;*

*an engine disposed in said housing and supported generally horizontally within said housing; and*

*a jet drive unit disposed in said housing below said engine and extending generally parallel to said engine, said jet drive unit extending from the rear of said housing and being operatively attached to said engine in said housing.*

*19. An outboard jet drive in accordance with claim 18 in which a fuel tank is mounted in said housing and coupled to said engine.*

*20. An outboard jet drive boat in accordance with claim 18 in which said engine is a diesel engine.*

*21. An outboard jet drive in accordance with claim 18 including a fuel pump disposed in said housing and coupled to said fuel tank.*

*22. An outboard jet drive in accordance with claim 18 in which said jet drive unit is mounted through said housing rear side and attached to said front and rear sides.*

*23. An outboard jet drive boat in accordance with claim 18 in which said engine has monitoring sensors.*

*24. An outboard jet drive in accordance with claim 18 having a clutched belt drive operatively connecting said engine to said jet drive.*

*25. An outboard jet drive in accordance with claim 18 in which said housing is sealed against the intrusion of water and partially extends into the water when said housing is afloat to provide buoyancy.*

*26. An outboard jet drive in accordance with claim 18 in which said engine has a sealed engine coolant system whereby the engine cooling is not dependent upon water from the body of water upon which the housing is floating.*

*27. An outboard jet drive in accordance with claim 18 in which said housing has an auxiliary battery disposed therein.*

*28. An outboard jet drive in accordance with claim 22 in which said engine is disposed in a reverse direction to said jet drive unit.*

*29. An outboard jet drive in accordance with claim 18 in which said housing is adapted to be removably attached to an exterior portion of a boat hull.*

*30. An outboard jet drive in accordance with claim 18, in which said jet drive unit defines a substantially linear water travel path.*

* * * * *